US011886156B2

(12) United States Patent
Dharamshi et al.

(10) Patent No.: US 11,886,156 B2
(45) Date of Patent: Jan. 30, 2024

(54) SYSTEM AND METHOD FOR USER INTUITIVE VISUAL MANAGEMENT OF AUTOMATION OF BIOPROCESS

(71) Applicant: Cytiva Sweden AB, Uppsala (SE)

(72) Inventors: Dalesh Dharamshi, Uppsala (SE); Sudheer Mygapula, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

(21) Appl. No.: 17/130,711

(22) Filed: Dec. 22, 2020

(65) Prior Publication Data

US 2021/0109490 A1 Apr. 15, 2021

Related U.S. Application Data

(63) Continuation of application No. 15/568,361, filed as application No. PCT/EP2016/058943 on Apr. 21, 2016, now Pat. No. 10,901,381.

(30) Foreign Application Priority Data

Apr. 29, 2015 (IN) ............................ 2185/CHE/2015

(51) Int. Cl.
*G05B 17/02* (2006.01)
*G05B 13/04* (2006.01)

(52) U.S. Cl.
CPC ............ *G05B 17/02* (2013.01); *G05B 13/041* (2013.01); *G05B 2219/23258* (2013.01);
(Continued)

(58) Field of Classification Search
None
See application file for complete search history.

(56) References Cited

U.S. PATENT DOCUMENTS 6,326,147 B1 12/2001 Oldham et al.
7,647,126 B2 1/2010 Blevins et al.
(Continued)

FOREIGN PATENT DOCUMENTS

| CN | 101774700 A | 7/2010 |
|---|---|---|
| CN | 103216222 A | 7/2013 |
| JP | H09-288612 A | 11/1997 |

OTHER PUBLICATIONS

Toumi et al., "Design and Optimization of a Large Scale Biopharmaceutical Facility Using Process Simulation and Scheduling Tools", Pharmaceutical Engineering, Mar./Apr. 2010 (Year: 2010).*

(Continued)

*Primary Examiner* — Carlos R Ortiz Rodriguez
(74) *Attorney, Agent, or Firm* — Eversheds Sutherland (US) LLP (57) ABSTRACT

A system for providing an improved way of user intuitive visual management of bioprocess automation is disclosed. The system includes a processor and a memory. The processor is configured to present a graphical presentation of the bioprocess automation script and results associated with execution of the bioprocess automation script of a bioprocess, wherein the graphical presentation comprises an anticipated result and an anticipated flow path associated with the bioprocess; and modify the graphical presentation by varying at least one of the anticipated result and the anticipated flow path.

23 Claims, 4 Drawing Sheets

(52) U.S. Cl.
CPC .............. *G05B 2219/23452* (2013.01); *G05B 2219/32341* (2013.01); *G05B 2219/37453* (2013.01); *Y02P 90/02* (2015.11)

(56) References Cited

U.S. PATENT DOCUMENTS

| | | |
|---|---|---|
| 7,680,546 B2 | 3/2010 | Gilbert et al. |
| 8,554,486 B2 | 10/2013 | Lurie et al. |
| 9,591,985 B2 | 3/2017 | Koike et al. |

OTHER PUBLICATIONS

Kim, Sehoon, et al. "Real-time monitoring of glycerol and methanol to enhance antibody production in industrial Pichia pastoris bioprocesses." Biochemical engineering journal 94 (2015): 115-124. (Year: 2015).*
Nilsson, "Object-Oriented Modelling of a Controlled Chemical Process", 1990 Department of Automatic Control, Lund Institute of Technology (Year: 1990).
Kelly et al., "Computational Fluid Dynamics Model for Predicting Flow of Viscous Fluids in a Large Fermentor with Hydrofoil Flow Impellers and Internal Cooling Coils", 1998 American Chemical Society and American Institute of Chemical Engineers (Year: 1998).
Torto et al., "Recent trends in the application of microdialysis in bioprocesses", 1998 Elsevier Science (Year: 1998).
Chinese Office Action for CN Application No. 201680038365.0 dated May 21, 2020 (23 pages with English translation).
Japanese Office Action for JP Application No. 2017-556583 dated Jun. 22, 2020 (5 pages with English translation).

* cited by examiner

SYSTEM AND METHOD FOR USER INTUITIVE VISUAL MANAGEMENT OF AUTOMATION OF BIOPROCESS

CROSS REFERENCE TO RELATED APPLICATIONS

This application is a continuation application of U.S. application Ser. No. 15/568,361, filed Oct. 20, 2017, allowed, which claims the priority benefit of PCT/EP2016/058943, filed Apr. 21, 2016, which claims priority benefit of India Application No. 2185/CHE/2015, filed Apr. 29, 2015. The entire contents of which are hereby incorporated by reference herein.

FIELD OF THE INVENTION

The subject matter disclosed herein relates to a system and method for providing a user intuitive graphical presentation for designing the automation of bioprocess steps and subsequent visualization during or after the execution of these automated bioprocess steps.

BACKGROUND OF THE INVENTION

In all applications workflow oriented processes are very common. For instance bioprocess equipment is usually run manually or with an automated script. The user designs the automation script which includes modification of steps and parameters in a bioprocess. A bioprocess may have multitude of steps that may be sequential in nature. A flow path and the results of running the bioprocess are displayed as a graphical presentation during the execution of automation script. These are however not depicted during the design of the automation script. The user may hence not be able to visualize the results until the automation script is executed. Moreover during the execution of the automation script the user may not have a visual indication of the results to expect for remaining duration of the automation script. An example of a workflow oriented process is chromatography process. Chromatography is a well-established and valuable technique for separating chemical and biological substances and is widely used in research and industry, finding many applications in compound preparation, purification and analysis. There are many different forms of chromatography, liquid chromatography being of particular importance in the pharmaceutical and biological industries for the preparation, purification and analysis of proteins, peptides and nucleic acids. An exemplary chromatography process may involve multiple phases such as a prime phase, a sample phase, an elution phase and a washing phase. Different parameters need to be changed or modified in each phase to obtain the desired result for a chromatography run. Similarly other processes such as filtration, bioreactor process and cell harvesting processes also may have to go through multiple iterations of change in parameters and then run to achieve the desired results.

Accordingly, a need exists for an improved system for visual management of automation of bioprocess in an efficient manner.

SUMMARY OF THE INVENTION

The object of the invention is to provide an improved system for designing the automation of bioprocess steps and subsequent visualization during or after the execution of these automated bioprocess steps as defined in the independent claim. This is achieved by the system having the capability of providing a more intuitive graphical presentation for designing the automation of a bioprocess based on charts and flow paths instead of steps and parameters alone. Further the system is capable of showing a comparison of the actual execution and the designed automation both during execution and post analysis after the execution of the bioprocess.

One advantage with the disclosed system is that it provides an improved way of visual management of bioprocess automation. The system includes a processor and a memory. The processor is configured to generate a graphical presentation of a bioprocess automation script and results associated with execution of the bioprocess automation script, wherein the graphical presentation comprises an anticipated result and anticipated flow path associated with the bioprocess; and modify the graphical presentation by varying at least one of the anticipated result and the anticipated flow path.

In another embodiment, a method for visual management of bioprocess automation is disclosed. The method includes generating a graphical presentation of a bioprocess automation script and results associated with execution of the bioprocess automation script, wherein the graphical presentation comprises an anticipated result and an anticipated flow path associated with the bioprocess; and modifying the graphical presentation by varying at least one of the anticipated result and the anticipated flow path.

A more complete understanding of the present invention, as well as further features and advantages thereof, will be obtained by reference to the following detailed description and drawings.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical and other changes may be made without departing from the scope of the embodiments. The following detailed description is, therefore, not to be taken as limiting the scope of the invention.

As discussed in detail below, embodiments of a system for visual management of bioprocess automation. The system includes a processor and a memory. The processor is configured to generate a graphical presentation of a bioprocess automation script and results associated with execution of the bioprocess automation script, wherein the graphical presentation comprises an anticipated result and an anticipated flow path associated with the bioprocess; and modify the graphical presentation by varying at least one of the anticipated result and the anticipated flow path.

Figure 1:
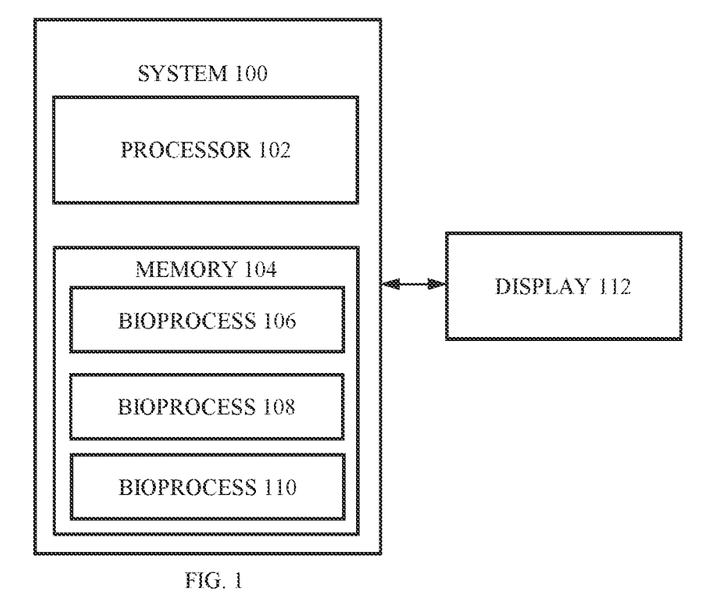
FIG. 1 is a schematic illustration of a system for visual management of bioprocess automation according to an embodiment.

FIG. 1 is a schematic illustration of a system 100 for visual management of bioprocess automation according to an embodiment. The system 100 includes a processor 102 and a memory 104. The system 100 may be embodied in a computing device. The processor 102 is configured to receive a set of data values for a process of a plurality of processes. The plurality of processes may include for example but not limited to, a chromatography process, a filtration process, a bioreactor process, a cell harvesting process, and any bioprocess. The set of data values may be associated with one or more measurement parameters of the process. The measurement parameters may include for instance, flow rate, gradient, ultraviolet (UV) intensity, conductivity rate and so on. The set of data values may include data values that indicate position of various parts in an equipment (for example a bioprocess equipment) that performs the process. So, in a bioprocess equipment the parts may include but not limited to valves, sensors, pumps, containers, fraction collectors and so on. The set of data values may not be always a numerical value however it may be envisioned that the set of data values can be provided in any form that enables to set the measurement parameters and the position of various parts without deviating from the scope of this disclosure.

In an embodiment the plurality of bioprocesses may be preset bioprocesses that are already stored. These bioprocesses may be in the form of bioprocess automation scripts. In an embodiment the bioprocess automation script includes multiple process steps to execute the bioprocess. These process steps may be sequential or not sequential. The preset bioprocesses may be stored in the memory 104. A user can select an appropriate preset bioprocess and provide inputs on data values associated with the measurement parameters and/or position of various parts of the equipment. In an embodiment multiple bioprocesses such as a bioprocess 106, a bioprocess 108 and a bioprocess 110 may be stored in a memory 104. The bioprocesses 106, 108 and 110 are preset bioprocesses. The bioprocesses 106, 108 and 110 may be different types of bioprocesses. In another scenario the bioprocesses 106, 108 and 110 may be associated with different versions of a particular type of bioprocess. For instance the bioprocesses 106, 108 and 110 may be associated with different versions of a chromatography process. In an embodiment the user may have to select a bioprocess and set it. The bioprocess may have data values that are also preset. So once the bioprocess is selected the data values are also automatically selected and received by the processor 102. The bioprocess automation script is executed based on the data values and a graphical presentation is generated. The graphical presentation comprises an anticipated result and an anticipated flow path associated with the bioprocess. The graphical presentation is presented to the user through a display 112. The bioprocess is not actually run however predicted or anticipated results associated with running the bioprocess is presented as a graphical presentation along with anticipated flow path. The bioprocess may include multiple phases and the measurement parameters may be subject to variation in each phase. The graphical presentation includes a plurality of graphical elements. Each graphical element is associated with a measurement parameter. Thus the graphical element in the graphical presentation indicates the variation of the measurement parameter in each phase of the bioprocess.

In another embodiment the user can design the bioprocess in real time. Thus the bioprocess automation script of the bioprocess is also designed in real time. This bioprocess automation script is executed to perform the bioprocess.

The user reviews the graphical presentation and modifies one or more graphical elements to vary anticipated result of the bioprocess. The graphical element may be associated with any one measurement parameter such as flow rate, gradient and so on. When the user changes a measurement parameter correspondingly there may be a change in the result of the executed bioprocess. The bioprocess may be then actually executed and actual results are presented along with the anticipated results so that the user can compare and understand the deviation in results.

Figure 2:
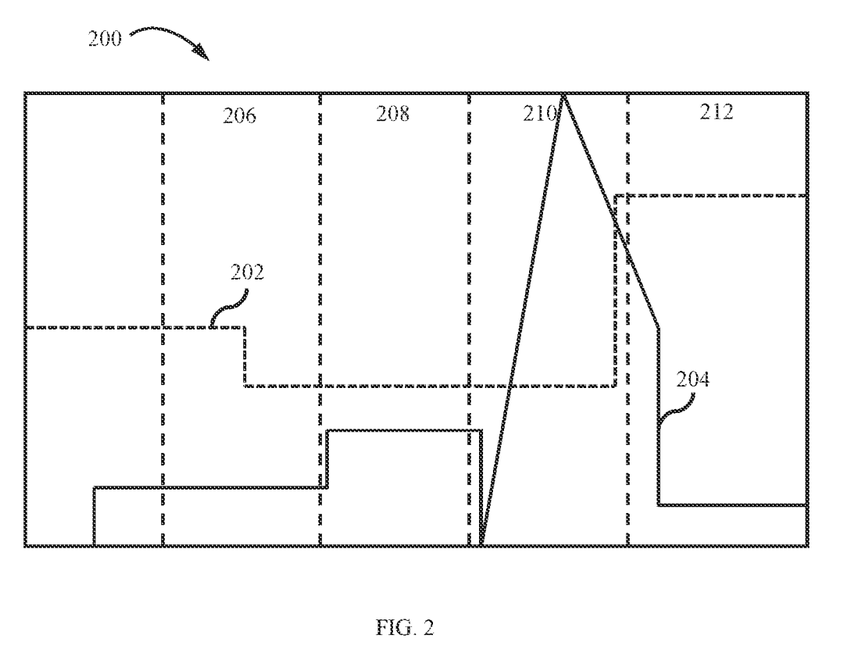
FIG. 2 illustrates a graphical presentation of a bioprocess according to an embodiment.

In an exemplary embodiment the method of user intuitive visual management of bioprocess automation is explained with respect to a chromatography process. However it may be envisioned that FIG. 2 illustrates a graphical presentation 200 of chromatography process. There may be different chromatography processes that are preset processes. These preset processes may have preset measurement parameters. In the graphical presentation 200, a graphical element 202 is associated with a flow rate and a graphical element 204 is associated with a gradient. The graphical presentation 200 also presents different phases of the chromatography process. For instance the phases may include a prime phase 206, a sample phase 208, an elution phase 210 and a wash phase 212. It may be noted that there may be multiple other phases for a different chromatography process or completely different phases for different bioprocesses. The number of phases for a bioprocess may also vary, as only four phases are presented in FIG. 2 however the bioprocess may have more than four phases or less than four phases. When the user selects the chromatography process then steps associated with this bioprocess is run as a simulation for each phase. During the simulation run the parameters of the bioprocess vary during each phase. The measurement parameters may be preset as explained earlier. In an embodiment the variations in the measurement parameters may be also preset for each phase. The graphical elements 202 and 204 are shown as varying in each phase indicating the change in the measurement parameters i.e. the flow rate and the gradient in these phases. As shown in FIG. 2 the graphical element 204 shows a sudden increase in the elution phase 210 indicating that the gradient has increased. The gradient than decreases as the bioprocess proceeds to the wash phase 212. Similarly the variation of the flow rate is also represented by the graphical element 202 in FIG. 2. Thus the user can visualize the expected results of a chromatography process and variation in measurement parameters that affects the end result. The user may want to make changes to the measurement parameters in phases of the bioprocess based on desired result.

Figure 3:
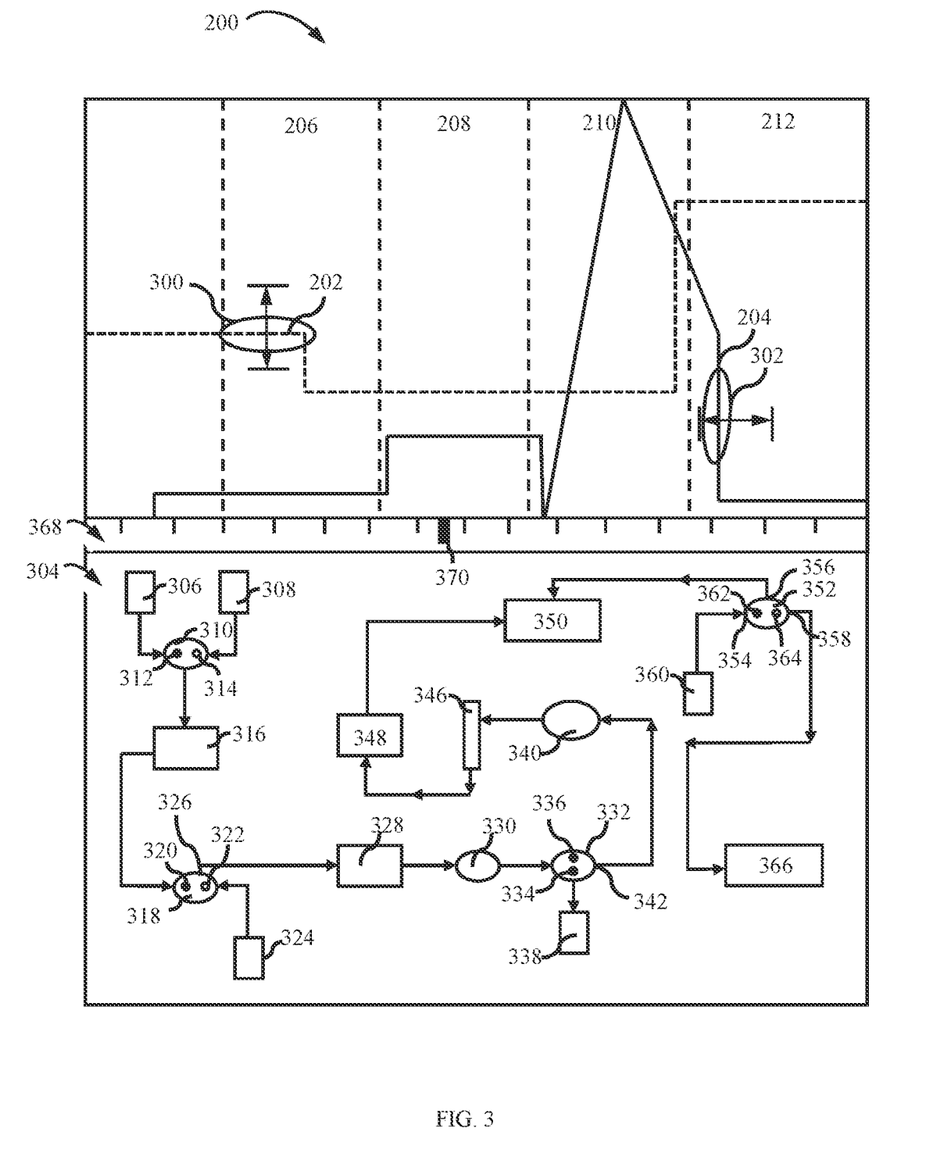
FIG. 3 illustrates the graphical presentation of the user modifying the graphical elements according to an embodiment.

The graphical elements 202 and 204 can be modified at any phase by the user. The modifications made on the graphical elements 202 and 204 enable the user to design the bioprocess and modify to obtain a desired result. FIG. 3 illustrates the graphical presentation 200 that the user modifies the graphical elements 202 and 204 according to an embodiment. For instance the user can modify the graphical element 202 at a region 300 by moving the graphical element 202 up or down from the current position. Further the graphical element 204 may be modified at a region 302 in the phase 212. The modifications made results in variation in the flow rate and gradient in the phases 206 and 212 which in turn modifies the result of the bioprocess.

A flow path 304 is presented along with the graphical presentation 200 to visually show the components and the flow path of liquid through the components for executing the bioprocess. The flow path 304 may be an anticipated flow path and hence it may be interchangeably used. The flow path 304 is a visual representation of the components and bioprocess steps that enables the user to modify the bioprocess by making variations in the flow path 304. In an embodiment for a chromatography process, as shown in FIG. 3 there are two buffer solutions in a container 306 and a container 308. The container 306 supplies a buffer to a valve 310. In an embodiment the user can select one of the containers 306 and 308 to supply appropriate buffer through the valve 310. The valve 310 shows a selector 312 and a selector 314 for the container 306 and the container 308 respectively. Currently as shown in FIG. 3 it is indicated that user selected the selector 312 and the buffer from the container 306 is allowed to pass through the valve 302. The buffer from the container 306 then mixes in a mixer 316. Mixed fluid from the mixer 316 then passes through a sample valve 318. The flow rate of the buffer from the container 306 and the mixed fluid remains constant till the phase 206. The sample valve 318 includes two inlets and an outlet that can be selected using selectors 320 and 322. As shown in FIG. 3, the selector 320 is selected by the user so that the mixed fluid enters the sample valve 318. The selector 322 may be selected to allow a fluid to pass from a container 324. Then the mixed fluid flows out from the sample valve 318 through an outlet valve 326 to enter a pump 328. The pump 328 then pumps the mixed fluid to a pressure pump 330. The pump 328 reduces the flow rate of the mixed fluid in the phase 206 (i.e. the prime phase). The pressure pump 330 then pumps the mixed fluid. The gradient is indicated by the variation (steep increase) in the graphical element 204. The steep increase in the graphical element 204 indicates an increase in the gradient of the mixed fluid.

The mixed fluid then gets pumped to a wash valve 332. The wash valve 332 includes two inlets and an outlet. The wash valve 332 also includes a selector 334 and a selector 336. The user selects the selector 334 so that fluid from a container 338 is also supplied to the wash valve 332. The mixed fluid and the fluid from the container 338 mix and then supplied to an injection valve 340 through an outlet 342 of the wash valve 332. The mixed fluid is then allowed to flow through the outlet 342 upon selecting the selector 336. The mixed fluid enters the injection valve 340 to reach a column 346. The mixed fluid passes through a UV sensor 348 and then through a conductivity sensor 350. The flow path 304 also includes a valve 352 having an inlet 354 and outlets 356 and 358. A fluid from a container 360 is supplied into the valve 352 through the inlet 354. The user selects a selector 362 for allowing the fluid to enter through the inlet 354 into the valve 352. The fluid from the container 360 then enters the conductivity container 350 through the outlet 356. When the user selects a selector 364 then the fluid with increased conductivity is supplied to a fractional collector 366. The fraction collector 366 may hold multiple tubes that can hold different fluids.

The graphical presentation 200 also presents an axis 368. The axis 368 may be associated with for example time, volume and so on. The axis 368 includes multiple time markers and also a time bar 370 that can be moved along the time axis 368. Each bioprocess or bioprocess step may have a required time for executing the bioprocess or the bioprocess step. This required time can be represented in the time axis 368. The time axis 368 may indicate multiple time indicators with a space of 10 seconds for instance a time indicator 372 represents 10 seconds and a time indicator 374 represents 20 seconds. So when the time bar 370 is moved to a particular time indicator in the time axis 368 then corresponding anticipated result and the anticipated flow path at that time for the bioprocess is presented. In an embodiment the time bar 370 can be scrolled by a user input for instance pointer based input, a touch based input, a gesture based input and so on. The pointer based input may be provided using a mouse, a track pad, touch pad and so on. The anticipated flow path and the anticipated result are associated with the phases 206, 208, 210 and 212. As shown in FIG. 3 the time bar 70 indicates 75 minutes and a portion of the flow path 304 may be active or running at this time instance. In that case this portion of the flow path 304 for the time instance 75 minutes is the anticipated flow path for a particular bioprocess or a bioprocess step. The user can modify the anticipated flow path (at the 75 minutes) associated with any of the phases 206, 208, 210 and 212 by making any changes in the graphical presentation of the anticipated flow path. Thus the user can appropriately make modifications in the anticipated flow path 304 and the graphical presentation 200 to obtain and edit the desired result for the bioprocess. This enables the user to conveniently design a process based on anticipated or predicted results obtained through multiple iterations of the process. Accordingly the user may be able to compare the results of the actual run with simulation results to determine the variation from the desired results of the user.

It may be noted that the graphical presentation 200 as illustrated in FIG. 2 and FIG. 3 are exemplary graphical presentation and thus anticipated result and the anticipated flow path can be visually presented in different ways and views without deviating from the scope of this disclosure.

Figure 4:
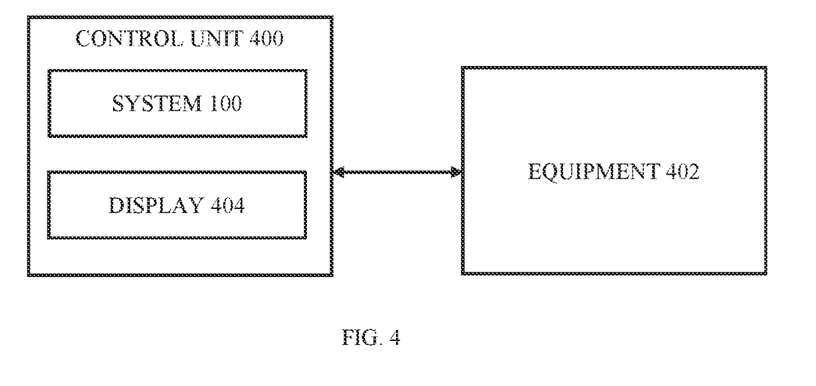
FIG. 4 illustrates a control unit that embodies the system for visual management of bioprocess automation in an equipment according to an embodiment.

FIG. 4 illustrates a control unit 400 that embodies the system 100 for graphically presenting data values and manipulating results associated with a process run in equipment 402 according to an embodiment. The control unit 400 may be embodiment with a computing device that may be operated by the user. The computing device may be connected to the equipment 402. The computing device may be normal purpose computer. In another embodiment the control unit 400 may be an integral part of the equipment 402. The control unit 400 includes a display 404 that presents the graphical presentation 200 and the flow path 304 and anticipated results so that the user can review them make modifications in the graphical elements and flow path to make changes in the process for obtaining desired results. In an embodiment the display 404 may be touch based display that is capable of receiving touch inputs from user to make modifications in the graphical elements and the flow path. The equipment 402 may be but not limited to a chromatography equipment, a filtration equipment, a bioreactor equipment, a cell harvesting equipment and any bioprocess equipment.

Figure 5:
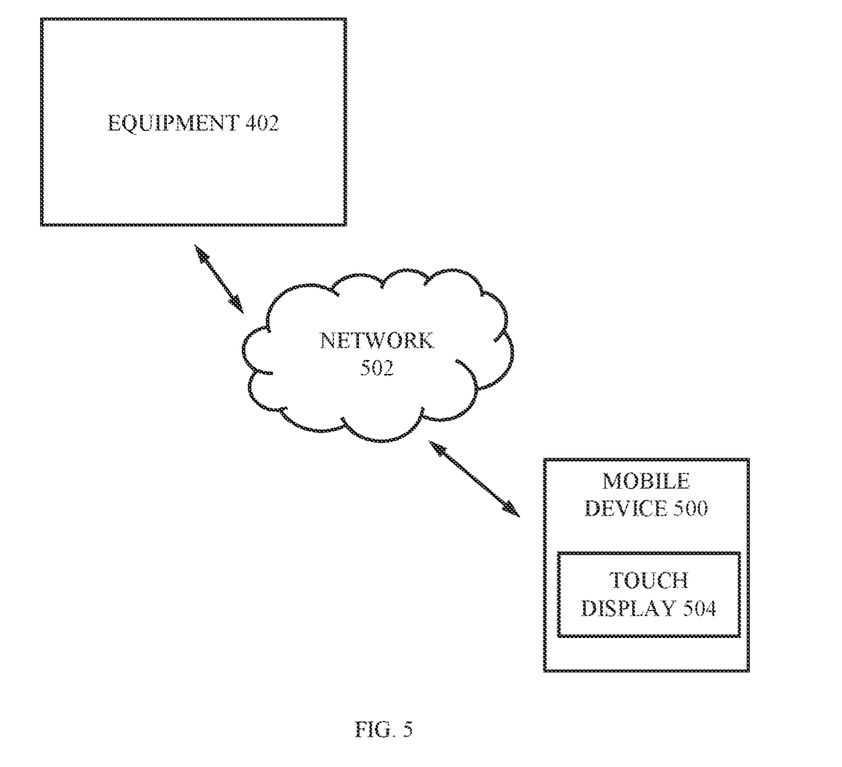
FIG. 5 illustrates a mobile device that communicates with the equipment over a network according to an embodiment.

FIG. 5 illustrates a mobile device 500 that communicates with the equipment 402 over a network 502 according to an embodiment. The mobile device 500 may include for example, a smart phone, a personal digital assistant (PDA), and a tab device. The mobile device 500 may have a touch display 504 that facilitates to provide touch based inputs by the user. The mobile device 500 presents the graphical presentation 200 and the flow path 304 to the user. The user can review them to make modifications in the graphical elements and the flow path to make changes in the process for obtaining desired result. As it is a touch display 504 the user can conveniently make the changes in the parameters of the process and flow path. In an embodiment an application for presenting the graphical presentation 200 and the flow path 304 may be configured within the mobile device 500. In another instance such an application may be downloaded and installed in the mobile device 500. The mobile device 500 communicates with the equipment 402 over the network 502. The network 502 may include but are not limited to, a Local Area Network (LAN), a wireless LAN (WLAN), a Wireless Wide Area Network (Wireless WAN), a Wireless Personal Area Network (Wireless PAN), a Wireless Metropolitan Area Network (Wireless MAN), a Wireless Telecommunication Network, a $3^{rd}$ Generation communication (3G) network, a $4^{th}$ Generation communication (4G) network, public network (e.g. Internet), and a Long Term Evolution communication (4G LTE) network. In another embodiment the mobile device 500 may be connected to the network 502 which includes a cloud network. In this scenario the application may be downloaded from the cloud network and installed in the mobile device 500 for analyzing and modifying the process by the user. The application downloaded may be associated with one process for instance chromatography process. Thus other applications associated with processes such as a filtration process, a bioreactor process and a cell harvesting process may need to be separately downloaded from the cloud network based on user's need. In another embodiment a single application may be associated with all the processes hence only this application may be downloaded and installed in the mobile device 500. The mobile device 500 enables a user to design and control the process from a remote location.

Figure 6:
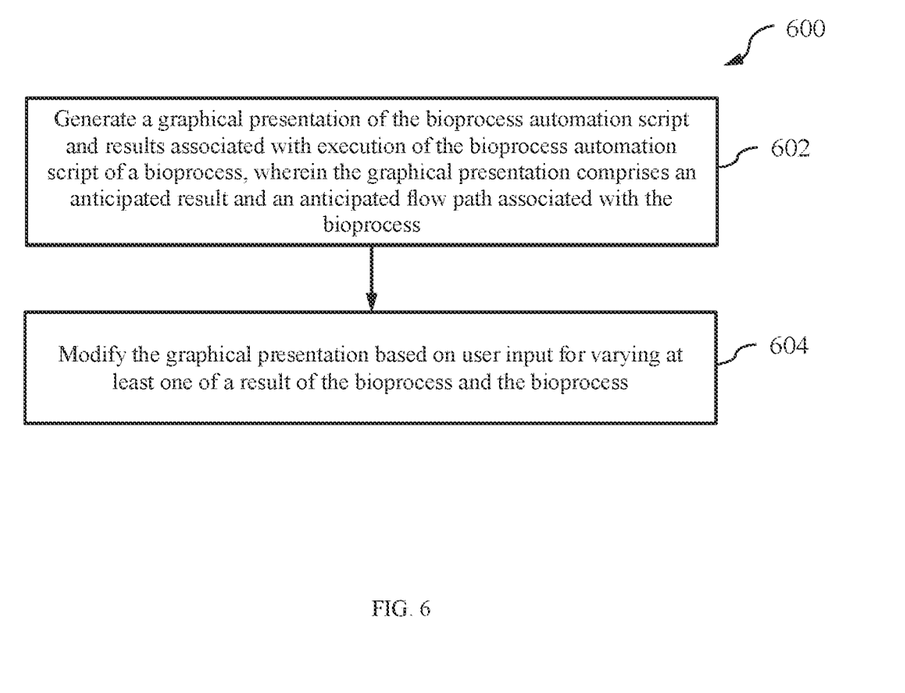
FIG. 6 illustrates a method for visual management of bioprocess automation according to an embodiment.

FIG. 6 illustrates a method 600 for graphically presenting data values and manipulating results according to an embodiment. In an embodiment a set of data values for bioprocess is received. The bioprocess may be of a plurality of bioprocesses. The set of data values may be associated with one or more measurement parameters of the bioprocess. The measurement parameters may include for instance, flow rate, gradient, ultraviolet (UV) intensity, conductivity rate and so on. A user can select an appropriate bioprocess and provide inputs on data values associated with the measurement parameters. In an embodiment the user may have to select a bioprocess and set it. The bioprocess may have data values that are preset. So once the bioprocess is selected the data values are also automatically selected. A bioprocess automation script and results associated with execution of the bioprocess automation script of the bioprocess are generated when the bioprocess runs. A graphical presentation comprising an anticipated result and an anticipated flow path is generated at block 602. The graphical presentation is of an anticipated result associated with the bioprocess which is presented. The bioprocess is not actually run however predicted or anticipated results associated with running the bioprocess is presented as a graphical presentation. The bioprocess may include multiple phases and the parameters may be subject to variation in each phase. The graphical presentation includes a plurality of graphical elements. Each graphical element is associated with a measurement parameter. Thus the graphical element in the graphical presentation indicates the variation of the measurement parameter in each phase of the bioprocess. The user reviews the graphical presentation and modifies one or more graphical elements to vary a result one or more of an anticipated result and an anticipated flow path at block 604. Each graphical element is associated with a measurement parameter. Thus the graphical element in the graphical presentation indicates the variation of the measurement parameter in each phase of the bioprocess. The user reviews the graphical presentation and modifies one or more graphical elements to vary a result of the bioprocess. The graphical element may be associated with any one parameter such as flow rate, gradient, ultraviolet (UV) intensity, and conductivity rate. When the user changes a parameter correspondingly there may be a change in the result of the bioprocess run. Thus the user may review the bioprocess run and variation of the parameters and then appropriately change these parameters by modifying the graphical elements prior to the actual bioprocess execution. Once the measurement parameters are finally corrected and selected by the user then the real-time execution of the bioprocess is started. Then a graphical presentation of the real-time execution of the bioprocess is also presented along with the graphical presentation of anticipated execution of the bioprocess (i.e. the anticipated results and the anticipated flow path). This enables the user to understand the deviations in the results and measurement parameters in the real-time executed bioprocess and the anticipated result.

Further in an embodiment while presenting the graphical presentation of the anticipated result of the bioprocess then a flow path of the bioprocess is also presented. The user can then modify the anticipated flow path based on their input. The user provides input through a touch based input or a pointer based input as described in conjunction with FIGS. 4 and 5.

From the foregoing, it will be appreciated that the above disclosed system provides an improved way of graphically presenting data values and manipulating results. The system enables a user to directly visualize a graphical presentation of anticipated execution of the bioprocess and modify graphical elements in the graphical presentation. The graphical elements are modified so that corresponding measurement parameters of the iterations. The user receives feedback on the results of the bioprocess. Thus this new user interaction and visualization that enables designing, performing and evaluating bioprocess runs. Thus a more visual and tactile to facilitate the way user's think facilitating a more intuitive and result oriented bioprocess. Further a flow path associated with the bioprocess can also be edited prior to actual run of the bioprocess. The user can design an expected result by directly editing a resulting bioprocess, and the user can also design the expected flow path changes by directly editing the flow scheme. The expected result is generated during bioprocess design and the expected result can be used to compare both the actual bioprocess run in progress and the final generated result of the bioprocess. In an instance the user can also provide user inputs using a mobile device through a touch based display. The user consumes only less time in formulating the bioprocess.

The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

This written description uses examples to disclose the invention, including the best mode, and also to enable any person skilled in the art to practice the invention, including making and using any computing system or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A system for visual management of bioprocess automation, the system comprising:
   a processor and a memory, the processor configured to:
      generate a first graphical presentation for the design of a bioprocess automation script configured to execute a bioprocess and results associated with execution of the bioprocess automation script of the bioprocess, wherein the first graphical presentation comprises an anticipated result and an anticipated flow path associated with the bioprocess; and
      modify the first graphical presentation by varying at least one of the anticipated result and the anticipated flow path; and
   a display for presenting the first graphical presentation and a second graphical presentation of a real-time execution of the bioprocess, wherein the processor is configured to generate the second graphical presentation using data that indicates positions of various parts in a bioprocess equipment that performs the bioprocess.

2. The system of claim 1, wherein the bioprocess comprises a plurality of phases.

3. The system of claim 2, wherein the first graphical presentation comprises a plurality of graphical elements, wherein each graphical element is associated with a measurement parameter associated with the bioprocess.

4. The system of claim 3, wherein the processor modifies the first graphical presentation by editing the graphical element for changing the measurement parameter based on user input thereby varying at least one of the anticipated results and the anticipated flow path of the bioprocess.

5. The system of claim 4, wherein the graphical element is associated with a phase of the plurality of phases.

6. The system of claim 5, wherein the graphical element is edited based on user input.

7. The system of claim 3, wherein the processor:
   presents at least one of the anticipated flow path and the anticipated result of the bioprocess; and
   modifies at least of the anticipated flow path and the anticipated result based on user input.

8. The system of claim 1, wherein the display displays a third graphical presentation of an expected execution of the bioprocess along with the second graphical presentation of the real-time execution of the bioprocess.

9. The system of claim 1, further configured to enable post analysis to be performed after the execution of the bioprocess.

10. The system of claim 1, wherein the bioprocess includes a chromatography process.

11. The system of claim 1, wherein the bioprocess automation script includes at least one preset process that may optionally have preset measurement parameters.

12. A method for visual management of bioprocess automation, the method comprising:
   presenting a first graphical presentation for the design of a bioprocess automation script configured to execute a bioprocess and results associated with execution of the bioprocess automation script of the bioprocess, wherein the first graphical presentation comprises an anticipated result and an anticipated flow path associated with the bioprocess; and
   modifying the first graphical presentation by varying at least one of the anticipated result and the anticipated flow path;
   generating a second graphical presentation of a real-time execution of the bioprocess using data that indicates positions of various parts in a bioprocess equipment that performs the bioprocess; and
   presenting the second graphical presentation of the real-time execution of the bioprocess,
   wherein the second graphical presentation is generated using data that indicates positions of various parts in a bioprocess equipment that performs the bioprocess.

13. The method of claim 12, wherein the bioprocess comprises a plurality of phases.

14. The method of claim 12, wherein the first graphical presentation is associated with an anticipated flow path of the bioprocess.

15. The method of claim 14, wherein the first graphical presentation comprises a plurality of graphical elements, wherein each graphical element is associated with a measurement parameter associated with the bioprocess.

16. The method of claim 15, wherein modifying the first graphical presentation comprises editing the graphical element for changing the measurement parameter thereby varying at least one of the anticipated result and the anticipated flow path of the bioprocess.

17. The method of claim 16, wherein the graphical element is associated with a phase of the plurality of phases.

18. The method of claim 17, wherein the graphical element is edited based on user input.

19. The method of claim 14 further comprising:
   presenting at least one of the anticipated flow path and the anticipated result of the bioprocess; and
   modifying at least one of the anticipated flow path and the anticipated result based on user input.

20. The method of claim 12, further comprising displaying a third graphical presentation of an anticipated execution of the bioprocess along with the second graphical presentation of the real-time execution of the bioprocess.

21. The method of claim 12, further comprising performing post analysis after the execution of the bioprocess.

22. The method of claim 12, wherein the bioprocess includes a chromatography process.

23. The method of claim 12, wherein the bioprocess automation script includes at least one preset process that may optionally have preset measurement parameters.

* * * * *